US012280405B2

(12) United States Patent
Chen et al.

(10) Patent No.: US 12,280,405 B2
(45) Date of Patent: Apr. 22, 2025

(54) CIRCULATING-TYPE MATTRESS CLEANING MACHINE

(71) Applicant: Jiangsu Sea-lion Machinery Co., Ltd., Zhangjiagang (CN)

(72) Inventors: Hong Chen, Zhangjiagang (CN); Shengang Cai, Zhangjiagang (CN); Yexin Li, Zhangjiagang (CN); Lunan Wang, Zhangjiagang (CN); Fei Huang, Zhangjiagang (CN)

(73) Assignee: Jiangsu Sea-Lion Machinery Co., Ltd., Zhangjiagang (CN)

( * ) Notice: Subject to any disclaimer, the term of this patent is extended or adjusted under 35 U.S.C. 154(b) by 282 days.

(21) Appl. No.: 18/194,863

(22) Filed: Apr. 3, 2023

(65) Prior Publication Data

US 2024/0278290 A1 Aug. 22, 2024

(30) Foreign Application Priority Data

Feb. 22, 2023 (CN) ......................... 202310150405.2

(51) Int. Cl.
*B08B 3/02* (2006.01)
*B68G 15/00* (2006.01)

(52) U.S. Cl.
CPC ............ *B08B 3/022* (2013.01); *B68G 15/005* (2013.01); *B08B 2203/027* (2013.01)

(58) Field of Classification Search
None
See application file for complete search history.

(56) References Cited

U.S. PATENT DOCUMENTS 9,528,211 B2 * 12/2016 Lew ........................ D06F 18/00

FOREIGN PATENT DOCUMENTS

CN 115430650 A * 12/2022

OTHER PUBLICATIONS

CN-115430650-A translation (Year: 2022).*

* cited by examiner

*Primary Examiner* — Rita P Adhlakha
(74) *Attorney, Agent, or Firm* — Wang Law Firm, Inc.

(57) ABSTRACT

A circulating-type mattress cleaning machine, including a rack; a horizontal barrel, an inner container frame and a circulating pipeline. A cylindrical cavity is formed inside the horizontal barrel. The inner container frame rotatably mounted inside the cylindrical cavity around an central axis of the cylindrical cavity, and is designed for bearing multiple mattresses side by side and driving the mattresses to rotate around the central axis. Two spray pipes are provided at a top of the cylindrical cavity and on one side of the top of the cylindrical cavity, respectively. Multiple spray nozzles are successively provided on the spray pipe, the spray nozzles directly face the mattresses carried by the inner container frame. The circulating pipeline in fluid communication with a bottom of the cylindrical cavity, and the circulating pipeline being in communication with two spray pipes.

7 Claims, 3 Drawing Sheets

CIRCULATING-TYPE MATTRESS CLEANING MACHINE

TECHNICAL FIELD

The present invention relates to washing machines and more particularly to a circulating-type mattress cleaning machine.

BACKGROUND ART

In the traditional clothes washing equipment, clothes are directly placed in water and then rotated for cleaning. However, a mattress is different. When a mattress is cleaned, it is impossible to be directly immersed in water and rotated for cleaning. So a different cleaning structure needs to be developed.

SUMMARY OF THE INVENTION

It is an object of the present invention to provide a circulating-type mattress cleaning machine that uses a spraying form to clean a mattress while using circulating water to continuously conduct spraying, thereby saving water resources and improving the cleaning effect.

In order to achieve the above object, an embodiment of the present invention disclose a circulating-type mattress cleaning machine, including a rack; a horizontal barrel, an inner container frame and a circulating pipeline. A cylindrical cavity is formed inside the horizontal barrel. The inner container frame rotatably mounted inside the cylindrical cavity around an central axis of the cylindrical cavity, and is designed for bearing multiple mattresses side by side and driving the mattresses to rotate around the central axis. Two spray pipes are provided at a top of the cylindrical cavity and on one side of the top of the cylindrical cavity, respectively. Multiple spray nozzles are successively provided on the spray pipe, the spray nozzles directly face the mattresses carried by the inner container frame. The circulating pipeline in fluid communication with a bottom of the cylindrical cavity, and the circulating pipeline being in communication with two spray pipes.

In a embodiment of the circulating-type mattress cleaning machine, a first sealing door that can be opened and closed is provided at a position on the upper part of one side of the horizontal barrel.

In a embodiment of the circulating-type mattress cleaning machine, during cleaning, a certain amount of liquid is stored in the cylindrical cavity, and a water level of the liquid is lower than the bottom of the sealing door.

In a embodiment of the circulating-type mattress cleaning machine, a second sealing door that can be opened and closed is provided at a position on an upper part of the other side of the horizontal barrel, and the two sealing doors are respectively located in a non-cleaned area and a cleaned area.

In a embodiment of the circulating-type mattress cleaning machine, a first pump is provided on the circulating pipeline, the circulating pipeline is further connected to a first sewage discharge pipeline and a recovery pipeline, respectively, and a first valve and a second valve are mounted to the first sewage discharge pipeline and the recovery pipeline, respectively.

In a embodiment of the circulating-type mattress cleaning machine, the cylindrical cavity is provided at the bottom thereof with a second sewage discharge pipeline having a third valve provided thereon.

In a embodiment of the circulating-type mattress cleaning machine, a water inlet pipeline is further provided on one side of the horizontal barrel, a second pump is provided on the water inlet pipeline, and the water inlet pipeline extends to the inside of the horizontal barrel to be formed with an original water inlet and a recovery water inlet, respectively.

Compared with the prior art, the present invention has the advantage the cleaning machine continuously sprays the liquid in the cylindrical cavity from the top down in a circulating manner through the circulating pipeline, not only reducing water consumption but also improving the cleaning effect.

BRIEF DESCRIPTION OF THE DRAWINGS

In order to illustrate the embodiments of the present invention or the technical solutions in the prior art more clearly, the following will briefly introduce the drawings that need to be used in the description of the embodiments or the prior art. Obviously, the drawings in the following description are merely some embodiments recorded in the present invention. For those of ordinary skills in the art, other drawings can be obtained according to these drawings without involving inventive efforts.

DETAILED DESCRIPTION OF THE INVENTION

The embodiments of the present invention will be described in detail below in conjunction with the accompanying drawings in the embodiments of the present invention. Obviously, the described embodiments are only a part of the embodiments of the present invention, rather than all the embodiments. Based on the embodiments of the present invention, all other embodiments obtained by one of ordinary skills in the art without involving any inventive effort are within the scope of the present invention.

Figure 1:
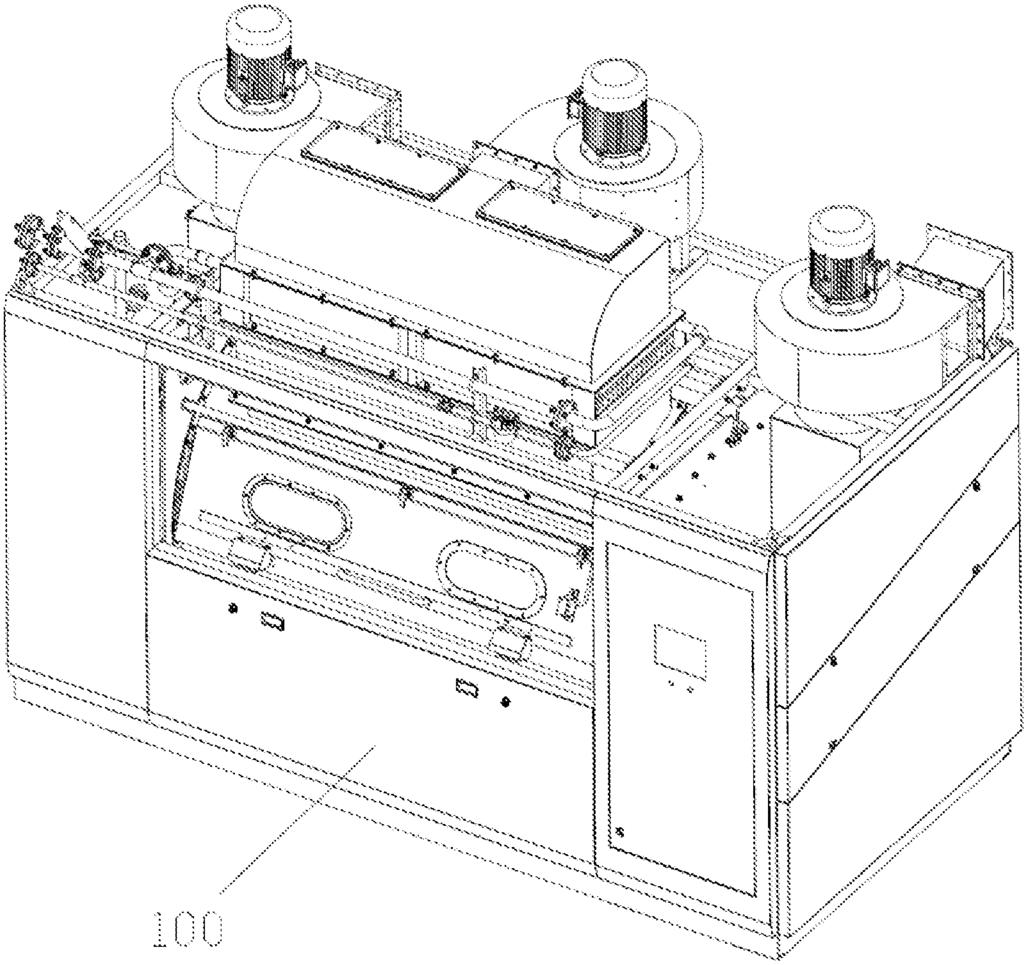
FIG. 1 is a perspective view of a circulating-type mattress cleaning machine according to an embodiment of the present invention.
Figure 2:
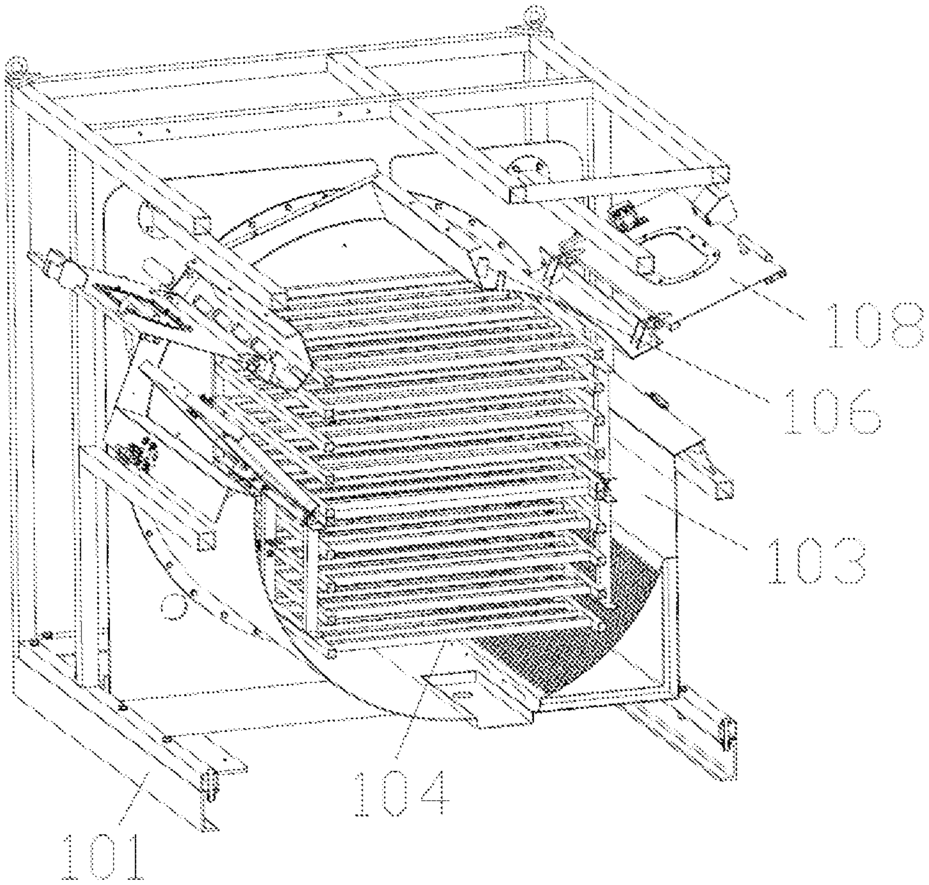
FIG. 2 is a sectional view of a circulating-type mattress cleaning machine according to an embodiment of the present invention.
Figure 3:
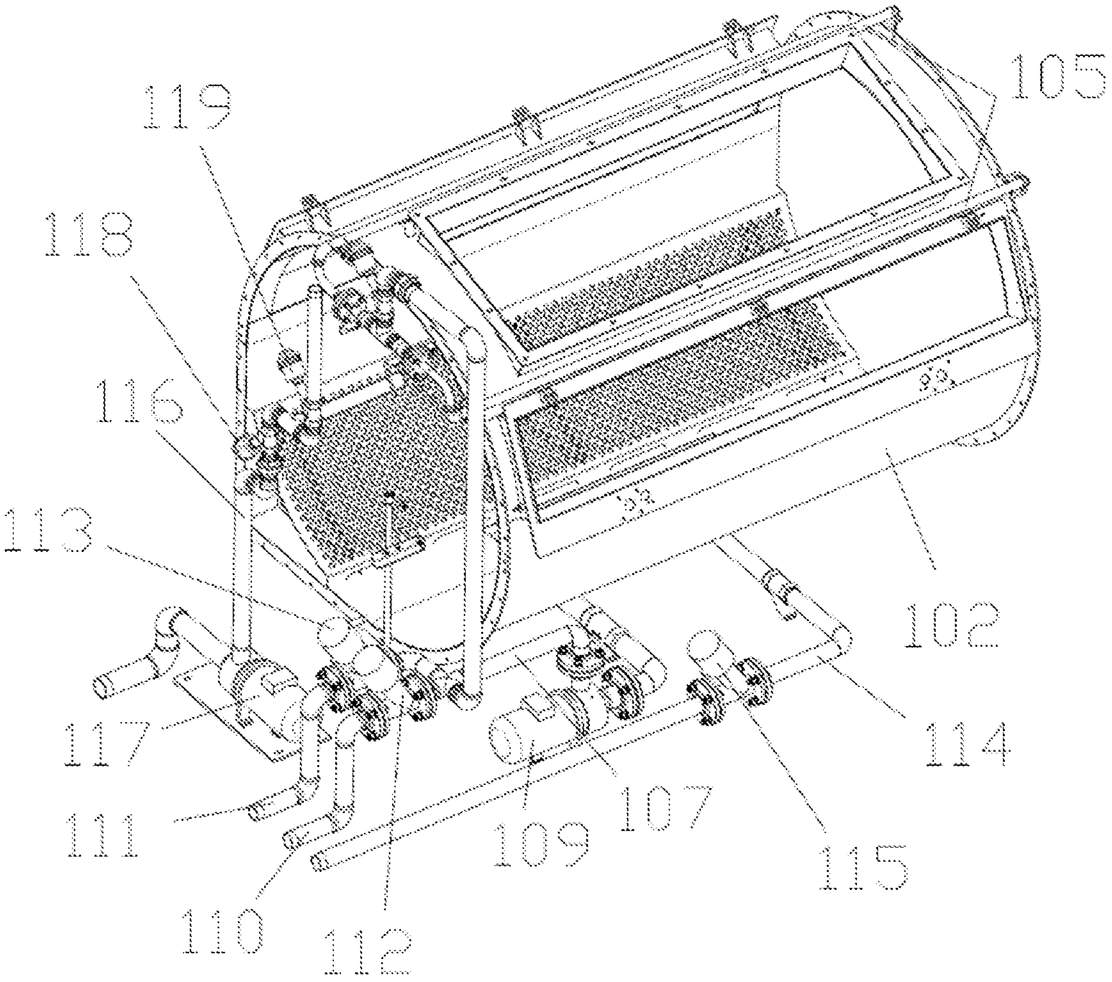
FIG. 3 is a schematic view of a circulating-type mattress cleaning machine according to an embodiment of the present invention.

With reference to FIGS. 1-3, a circulating-type mattress cleaning machine 100 comprises a rack 101 and a horizontal barrel 102 arranged inside the rack 101. A cylindrical cavity 103 is formed inside the horizontal barrel 102, an inner container frame 104 is rotatably mounted around an axis center inside the cylindrical cavity 103. The inner container frame 104 is designed for placing multiple mattresses side by side and driving the mattresses to rotate around the axis of the cylindrical cavity 103. Two spray pipes 105 are respectively arranged at the top of the cylindrical cavity 103 and at one side of the top of the cylindrical cavity 103, and multiple spray nozzles 106 are successively provided on the spray pipe 105. The spray nozzle 106 directly faces the mattress carried by the inner container frame 104, the bottom of the cylindrical cavity 103 is in communication with a circulating pipeline 107, and the circulating pipeline 107 is in communication with two spray pipes 105.

In this embodiment, after the mattresses are placed into the inner container frame 104, a cleaning liquid is passed into the cylindrical cavity 103. Due to the existence of the circulating pipeline 107, the liquid can be circulated into the spray pipe 105, and then sprayed onto the mattress from a spray nozzle, and a certain pressure is set to ensure cleaning. Due to the continuous rotation of the inner container frame, the spray nozzle can spray the liquid at different positions of different mattresses, and can achieve full-coverage spray cleaning, which ensures cleaning, saves water, and improves the cleaning effect.

Further, a sealing door 108 that can be opened and closed is provided on the upper part of one side of the horizontal barrel 102. During cleaning, a certain amount of liquid is stored in the cylindrical cavity 103, and the water level of the liquid is lower than the bottom of the sealing door 108.

In this embodiment, storing a certain water level can achieve continuous mattress washing, further improving the cleaning effect.

Further, the upper part of the other side of the horizontal barrel 102 is provided with another sealing door 108 which can be opened and closed, and the two sealing doors 108 are respectively located in a non-cleaned area and a cleaned area.

In this embodiment, since it is necessary to directly take out the cleaned mattress from the cleaned area due to special industries such as hospitals, it is necessary to provide two doors, namely, the cleaning machine is mounted to a separation wall, and the non-cleaned area and the cleaned area belong to two ends, respectively. The other door is closed when the mattress is placed, and the door of the non-cleaned area is closed after the cleaning is completed, thus preventing cross-infection after the cleaning is completed.

Further, a first pump 109 is provided on the circulating pipeline 107, and the circulating pipeline 107 is also connected to a first sewage discharge pipeline 110 and a recovery pipeline 111, respectively. A first valve 112 and a second valve 113 are mounted to the first sewage discharge pipeline 110 and the recovery pipeline 111, respectively. The bottom of the cylindrical cavity 103 is additionally provided with a second sewage discharge pipeline 114 on which a third valve 115 is provided.

In this embodiment, the first sewage discharge pipe functions to discharge sewage when the washing is completed; the position of the connection of the second sewage discharge pipe is the lowest such that the sewage discharge can be maximized; the recovery pipeline can recover and treat the liquid which has been washed twice and three times, etc. after sewage discharge, so as to further save water resources.

Further, a water inlet pipeline 116 is provided on one side of the horizontal barrel 102, a second pump 117 is provided on the water inlet pipeline 116, and the water inlet pipeline 116 extends to the inside of the horizontal barrel 102 to be formed with an original water inlet 119 and a recovery water inlet 118, respectively.

In this embodiment, it is used for original water inflow operation and can achieve water recovery.

It needs to be noted that the relational terms such as the first and the second, and the like herein are merely intended to distinguish one entity or operation from another entity or operation without necessarily requiring or implying any actual such relationship or order between such entities or operations. Furthermore, the terms "comprises", "comprising", or any other variation thereof, are intended to cover a non-exclusive inclusion, such that a process, a method, an article, or equipment that comprises a list of elements not only includes those elements but also includes other elements not expressly listed or elements inherent to such process, method, article, or equipment. An element defined by the phrase "including one" does not, without more constraints, preclude the existence of additional identical elements in the process, method, article, or equipment that includes the element.

The foregoing are only specific implementation modes of the present invention. It should be noted that it will be apparent to those of ordinary skills in the art that several improvements and modifications can be further made without departing from the principle of the present invention, and such improvements and modifications should also be considered falling into the scope of the present invention.

What is claimed is:

1. A circulating-type mattress cleaning machine, comprising:

a rack;

a horizontal barrel provided inside the rack, wherein a cylindrical cavity is formed inside the horizontal barrel;

an inner container frame rotatably mounted inside the cylindrical cavity around a central axis of the cylindrical cavity, the inner container frame being designed for bearing multiple mattresses side by side and driving the mattresses to rotate around the central axis, wherein two spray pipes are provided at a top of the cylindrical cavity and on one side of the top of the cylindrical cavity respectively, multiple spray nozzles are successively provided on the two spray pipes, and the spray nozzles directly face the mattresses carried by the inner container frame; and a circulating pipeline in fluid communication with a bottom of the cylindrical cavity, and the circulating pipeline being in communication with the two spray pipes.

2. The circulating-type mattress cleaning machine according to claim 1, wherein a first sealing door that can be opened and closed is provided on an upper part of one side of the horizontal barrel.

3. The circulating-type mattress cleaning machine according to claim 2, wherein during cleaning, a certain amount of liquid is stored in the cylindrical cavity, and a water level of the liquid is lower than the bottom of the sealing door.

4. The circulating-type mattress cleaning machine according to claim 2, wherein a second sealing door that can be opened and closed is provided on an upper part of the other side of the horizontal barrel, and the two sealing doors are located in a non-cleaned area and a cleaned area, respectively.

5. The circulating-type mattress cleaning machine according to claim 1, wherein a first pump is provided on the circulating pipeline, the circulating pipeline is further connected to a first sewage discharge pipeline and a recovery pipeline, respectively, and a first valve and a second valve are mounted to the first sewage discharge pipeline and the recovery pipeline, respectively.

6. The circulating-type mattress cleaning machine according to claim 1, wherein the cylindrical cavity is provided at the bottom thereof with a second sewage discharge pipeline having a third valve provided thereon.

7. The circulating-type mattress cleaning machine according to claim 1, wherein a water inlet pipeline is further provided on one side of the horizontal barrel, a second pump is provided on the water inlet pipeline, and a part of water inlet pipeline that extends to the inside of the horizontal barrel is provided with an original water inlet and a recovery water inlet, respectively.

* * * * *